United States Patent
Hoffmann et al.

(10) Patent No.: US 9,729,510 B2
(45) Date of Patent: Aug. 8, 2017

(54) NETWORK CONSOLIDATION BY MEANS OF VIRTUALIZATION

(71) Applicant: NOKIA SOLUTIONS AND NETWORKS GMBH & CO. KG, Munich (DE)

(72) Inventors: Marco Hoffmann, Munich (DE); Hans-Jochen Morper, Erdweg (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 18 days.

(21) Appl. No.: 14/906,694

(22) PCT Filed: Jul. 24, 2013

(86) PCT No.: PCT/EP2013/065564
§ 371 (c)(1),
(2) Date: Jan. 21, 2016

(87) PCT Pub. No.: WO2015/010730
PCT Pub. Date: Jan. 29, 2015

(65) Prior Publication Data
US 2016/0164835 A1    Jun. 9, 2016

(51) Int. Cl.
*H04L 29/06* (2006.01)
*H04L 12/715* (2013.01)
*H04L 12/741* (2013.01)

(52) U.S. Cl.
CPC .......... *H04L 63/0245* (2013.01); *H04L 45/54* (2013.01); *H04L 45/64* (2013.01);
(Continued)

(58) Field of Classification Search
CPC . H04L 63/0245; H04L 63/0272; H04L 63/08; H04L 63/0281; H04L 63/10; H04L 45/64; H04L 45/54; H04L 45/74
See application file for complete search history.

(56) References Cited

U.S. PATENT DOCUMENTS 8,300,532 B1 * 10/2012 Venkatramani ....... H04L 45/306
370/235
8,462,780 B2 * 6/2013 Vincent ............... H04L 12/4633
370/343
(Continued)

OTHER PUBLICATIONS

Karp, Brad, et al. "GPSR: Greedy perimeter stateless routing for wireless networks.", Retrieved from http://dl.acm.org/citation.cfm?id=345953 , Proceedings of the 6th annual international conference on Mobile computing and networking. ACM, 2000.*
(Continued)

*Primary Examiner* — Chau Le
*Assistant Examiner* — Muhammad Chaudhry
(74) *Attorney, Agent, or Firm* — Squire Patton Boggs (US) LLP

(57) ABSTRACT

An apparatus, comprising an enhanced function block and a stateless function block; main routing means for routing, based on a header of a data packet and an incoming port, the data packet to one of the enhanced function block and the stateless function block; wherein the enhanced function blocks comprises providing means for providing an information comprised in the data packet to a control device; an enhanced function means for executing an enhanced function on the data packet to obtain a first processed data packet addressed to a destination address, wherein the enhanced function is based on an instruction for the data packet received in response to the provided information; and a first routing means for routing the first processed data packet to the destination address; and the stateless function blocks comprises a stateless function means for executing a stateless function on the data packet, wherein the stateless function is not based on an instruction for the data packet received in response to providing information comprised in the data packet to a control device, in order to, thus, obtain (Continued)

a second processed data packet; and returning means for returning the second processed data packet to the main routing means.

13 Claims, 14 Drawing Sheets

(52) U.S. Cl.
CPC .......... *H04L 45/74* (2013.01); *H04L 63/0272* (2013.01); *H04L 63/0281* (2013.01); *H04L 63/08* (2013.01); *H04L 63/10* (2013.01)

(56) References Cited

U.S. PATENT DOCUMENTS

| 8,553,552 B2* | 10/2013 | Hu | H04L 45/24 370/235 |
|---|---|---|---|
| 2003/0198189 A1 | 10/2003 | Roberts et al. | |
| 2013/0194971 A1* | 8/2013 | Montessoro | H04L 45/02 370/254 |
| 2013/0297798 A1* | 11/2013 | Arisoylu | H04L 67/1027 709/226 |

OTHER PUBLICATIONS

Yaar, Abraham, et al. "SIFF: A stateless internet flow filter to mitigate DDoS flooding attacks.", Retrieved from http://ieeexplore.ieee.org/stamp/stamp.jsp?arnumber=1301320 , Security and Privacy, 2004. Proceedings. 2004 IEEE Symposium on. IEEE, 2004.*
Yaxuan Qi, et al.; "OpenGate: Towards an open network services gateway"; Computer Communications, Elsevier Science Publisher BV, Amsterdam, NL, vol. 34, No. 2, 2010.
Adam Greenhalgh, et al.; "Flow Processing and the Rise of Commodity Network Hardware"; ACM SIGCOMM Computer Communication Review, vol. 39, No. 2; Mar. 31, 2009.
Bivio 7000 Series Network Appliance Platforms the Bivio 7000 Series Programmable Network Appliance; Jul. 22, 2007; XP055094481.
Hayashi Takeo, et al.; "Dynamically Reconfigurable Network Nodes in Cloud Computing Systems"; NEC Technical Journal, vol. 5, No. 2; 2010; pp. 143-147.
International Search Report and Written Opinion application No. PCT/EP2013/065564 mailed Mar. 14, 2014.

* cited by examiner

NETWORK CONSOLIDATION BY MEANS OF VIRTUALIZATION

FIELD OF THE INVENTION

The present invention relates to an apparatus, a method, and a computer program product related to virtual network architecture.

BACKGROUND OF THE INVENTION

FIG. 3 shows the basic architecture of a mobile network. In a simplified view, a mobile network comprises of five domains:
- User Equipment UE. Those may range from simple cellular mobile phones over smart phones to wireless notebooks
- Radio Access Network RAN comprising of base stations, antennas, everything that is there to provide radio access
- Mobile Core. This includes facilities necessary to handle user authentication and authorization, where user subscription data is stored (HSS home subscriber system)
- Service Delivery Framework SDF. This comprises of servers for mobile operator content and services including content delivery functions like cashing.
- Backend System. Here are the network management facilities and billing and charging systems.

In addition, there are two edges—between RAN and core and between core and world wide services networks.

The RAN/core edge comprises facilities which are mobile network generation dependant, i.e. in a 2G network (GSM) those comprise of base station controllers BSC which control bundles of base stations (e.g. for paging), in case of 3G (UMTS) those are radio network controllers (RNC) with much more complexity (terminating parts of the radio layer, performing soft combining). In a 4G network (long term evolution, LTE) there is no edge function since the function split again changed significantly with packet based (IP or Ethernet) connections from base station to the core and all radio layers terminated in the base station (eNodeB) and with mobility management moving to the core network into Mobility Management Entity MME.

The core/services networks edge comprises entities which handle the communication between the mobile network and the outside world. Mobile Switching Centres (MSC) handle narrowband circuit switched voice traffic (and MSC-Servers and media gateways Voice-over-IP based communication, not shown in figure). Packet data access to/from services networks (internet) is handled by a GPRS Gateway Serving Node (GGSN) or by a Servicing/Packet Gateway (S/P-GW) in case of 4G LTE.

Edge nodes like RNC or GGSN are unique points in the network since all traffic (at least all packet data traffic, i.e. all internet traffic) runs through them. Due to their complexity their numbers are limited per network so that there are a few crucial topological points in the network which are single points of failure and which may become performance bottlenecks as traffic increases significantly (200 times in 10 years).

According to this simplified architecture, a broadband fixed network architecture can be drawn alike (no specific figure, but see upper part of FIG. 4). Here the Access Network can have a digital subscriber line (DSL) Access Multiplexer (DSLAM) as an edge node (which terminates the physical layer towards the DSL modems) and a Broadband Remote Access Server (BRAS) as a core/services network edge node.

Both core edge nodes—the GGSN (or S/P-Gateway, respectively) of a mobile network and the BRAS in case of a fixed network are quite comparable:
- there exist only a few of them per network
- they are gateways to the outside world for packed data
- they are enriched with functionality as authentication, authorization, deep packet inspection (DPI), policy enforcement, etc.
- most typically they are based on router platforms
- they are problematic in terms of bottlenecks and single point of failure FIG. 4 shows a scenario where one operator runs both networks (fixed and mobile, e.g. Deutsche Telekom, Telefonica) with the upper part representing the fixed network and the lower part representing the mobile network. Furthermore, FIG. 4 shows cellular Femto cells H(e)NodeB which provide a cellular air interface in home or enterprise environments and which are IP-connected over a fixed access network (DSL). Cellular traffic from femto cells will be run through the wireline network through the BRAS to a Security Gateway (SecGW) which belongs to the mobile network. The SecGW allows to run VPN encrypted links between the mobile network and the H(e)NodeB so that all UE-Mobile Network-traffic is secured when running through third party networks. The triple BRAS, SecGW and GGSN shall be denoted as "converged/consolidated edge" further on (indicated by a dotted line in FIG. 4).

Core network functions and nodes can be classified in two categories: there are pure control plane functions exchanging signaling information and there are functions and nodes that have both—control functions and data forwarding. The first category is in the primary focus of network virtualization since those can be "tailored" such that they can run as one or several applications on top of virtual machines in a "cloud". However, the edge nodes (e.g. GGSN, BRAS), due to their ambiguous nature (control and data forwarding) cannot be simply virtualized following pure data center principles—in pure IT data center setups there are no nodes that have this gateway function—thus data center technologies yet do not provide a suitable solution for gateway virtualization. But without virtualization of these edge nodes the virtualization of the mobile core remains unfinished, deficient and crippled—the full potential of network virtualization can not be applied.

The edge nodes (e.g. GGSN, BRAS) went through an evolution process. Especially mobile networks evolved from $2^{nd}$ generation global system for mobile communication (GSM) over $3^{rd}$ generation universal mobile telecommunication system (UMTS) to $4^{th}$ generation LTE—and most real world mobile networks thus comprise of functionality and nodes of multiple generations. In order to allow quick market entry and in order to save costs, quite often existing nodes were amended with new functionality (rather than introducing new nodes). Key functionalities like mobility anchors, deep packet inspection, traffic shaping were preferably put onto those nodes which are located at central cross points in the network, as for example RAN/core edge or core/services network edge. During this evolution process those nodes have been enriched (or even overloaded) with functionality. This—to some extend may apply for the RNC, but especially for the GGSN and for the BRAS.

Now, in times of ever increasing traffic (100-300 times in 10 years) this problem becomes more and more urgent since router platforms cannot scale up in terms of performance as it would be necessary in terms of traffic increase—but reducing performance bottlenecks by putting more of these nodes to the network would require changes in the architecture: mobility anchors would have to move (GGSN) or authentication, authorization, and accounting (AAA) servers and management systems would have to be distributed (BRAS).

FIG. 7 shows some of the functions these nodes may provide.

The BRAS is a big access router which mediates between outside (internet) and inside (user) IP traffic. If it is edging a DSL network, most likely it terminates point-to-point protocol (PPP) (and/or PPP over Ethernet, PPPoE) connections from client users. PPP encapsulated authentication information is verified (RADIUS client) against a AAA (RADIUS) server. Upon successful authentication clients are most commonly assigned an IP address out of a pool provided by a Dynamic Host Configuration Protocol (DHCP) server requested by the BRAS' DHCP client function. In case of forwarding traffic to a remote BRAS or in case of receiving relayed traffic from a remote BRAS the BRAS employs layer-2-tunneling protocol (L2TP). In order to reduce overall traffic load the BRAS may also employ means of traffic shaping.

Alike, the GGSN is a giant remote access server connecting the cellular users to the outside IP world. By this it provides means for authorization (is the user allowed to use a service). In case users employ a specific service (access point number, APN, e.g. internet access) a packet-data-protocol (PDP)-context is stored in the GGSN. IP address dependant services access can additionally be performed by a service-selection-gateway (SSG) and user specific policies (e.g. bandwidth guarantee/limitation) can be enforced here. Also deep packet inspection can be employed e.g. to derive further IP address dependant billing information.

Finally, the SecGW has a simple functionality: it is the endpoint of virtual private network (VPN) tunnels. As there may be many of them, typically, a key issue is on performance rather than on complexity.

A major trend in telecommunications, also in mobile networks, especially in the core is to use data center technologies for applications. One motivation of that is to reduce total cost of ownership (TCO) since one platform (data center) can be used for many (most) applications that by today are often running on distinct network nodes. Furthermore, it allows a better scaling and more elasticity since applications can be invoked and terminated flexibly according to networking demands. FIG. 1 shows a typical setup of a data center and its management entities.

The data center itself comprises of hardware including multi core processing units and switching facilities (D-Switch in FIG. 1) to interconnect different processing units on the multiple blades in the multiple racks that make up a data center. The multiple computing parts will be equipped with an operating system (host OS, e.g. Linux) on which one or several virtual machines (VM) can be established. These VMs may be equipped with application software running on top of yet another operating system (guest OS, e.g. Linux, Windows). The control of the different VMs is done by a piece of e.g. HiperVisor (HV) middleware which acts as a mediator between the guest OS/VM and the host operating system hiding the virtual nature of the platform to the guest OS.

Virtual machines will be invoked/terminated and equipped with software images by a Infrastructure-as-a-service (IaaS) component, also denoted as Cloud Management System. On demand (of e.g. a cloud orchestration system) a specific software image (which may also include the guest OS) out of a list of software images that is stored in a database will be started on a virtual machine. The selection of the VM is done and controlled by this entity.

The Cloud Orchestration Function, e.g. NSN Cloud Framework CFW, stores templates for specific software that shall be deployed in a network which are stored in yet another database. Those templates comprise e.g. information about how many applications make up a network function (e.g. three applications together form a voice communication server VCS), which of the images that are stored in the IaaS database do reflect this application(s), the starting order of the different applications, identifiers (IDs) that allow to identify running applications and more. Per screen level command or triggered by and external network control (e.g. via http based interface) a new application can be started/stopped/modified and monitored. The Cloud Orchestration System will communicate with the IaaS or cloud management system, respectively, and directly/indirectly with the application. Yet those interfaces are still subject of standardization, current solutions employ Quantum and Eucalyptus and derivates of those.

Another trend is gaining momentum in communication service provider (CSP) networks: software defined networking (SDN)—i.e. decoupling of data forwarding and control.

By today, typical nodes in transport networks comprise of specific functionalities. A router, for example, comprises of data switching fabriques which move data packets between the different I/O ports. But it also handles all the complex routing protocols like resource reservation protocol (RSVP), it holds routing tables and more. All the complex functionality and the switching is encapsulated in one box. Another example would be a carrier Ethernet switch, providing data forwarding and control on layer 2. And more and more multilayer switches are used in transport networks providing (generalized) multi protocol label switching ((G-)MPLS) functionality which on top of the before mentioned router or switch functionality provide MPLS/G-MPLS signaling capability. Bottom line, depending for what purpose a transport node is used it is more or less complex providing data forwarding and control function in one monolithic node.

The basic idea of SDN is to decouple control functions from data forwarding functions, in other words, everything that makes a router being a router and everything that makes a switch being a switch is taken out of a node, let's call the remaining part network element (NE) and put the taken out part into a controller. What will be remaining in the NE is pure data forwarding functionality. With this philosophy, routers, switches, MPLS nodes would all have a similar look-alike NE for data forwarding, and a specific control element (which may be outside the box) which makes it a router or a switch or whatsoever.

FIG. 2 describes some principles of SDN.

At the bottom of the picture, a NE providing pure data forwarding functionality is shown. It comprises of the switching hardware (data path) which provides I/O ports, some pieces of software to allow configuration, a flow table which contains port based rules for data forwarding.

Here is a description of how to handle a packet depending on e.g. header information. For example, a rule may be that incoming packets on port 0 will be analyzed such that depending on what information is in the header, the packet shall be forwarded to port 2 or 3. These rules, which are stored in a flow table, can be passed to the NE from a controller which may reside outside the box (denoted as SDN control). For that, a protocol for exchange must be specified and both, the controller and the NE (SDN client)

must be able to mutually understand the protocol. A most prominent representative for an SDN control protocol is OpenFlow as specified in the Open Network Foundation (ONF). Another known representative is ForCES.

This way and with additional means a whole eco system for sharing transport equipment can be built up. NEs and controller can be cascaded and access can be limited. Introducing FlowVisors will limit access to certain parts of a Flow Table (e.g. ports 0 to 3). Controllers themselves may act as proxies to other controllers. Finally, SDN controllers may provide a northbound interface (i/f) to applications. By this, applications may acquire network resources via this interface in an abstracted way, e.g. "connectivity between topological point A and topological point B with a given bandwidth". SDN controllers may then instruct NEs out of a pool of NEs where there might be several options to solve the request—still hiding the network HW to the application by using this abstract interface.

The principle may be generalized:

If a node can be sufficiently characterized in a way that it comprises:
  at least one port for incoming and outgoing packet data communication (Ethernet port);
  software and hardware (Operating System, Ethernet backplane) that allows packet data transmission via this at least one port;
  functions that modify incoming/outgoing data streams/flows (de/encryption, tunnel termination);
  functions that use and/or modify information contained in the data stream (DPI),
then, this node can be decomposed into (see FIG. 8):
  a pure packet data forwarding engine comprising an commercial-off-the-shelf switch or router comprising multiple ports for incoming/outgoing packet data;
    software and hardware that allows conveying data streams/flows between ports;
    rules for conveying streams between ports based on information found in packed data headers (IP Header, Ethernet Header) stored in a database (flow table);
    and interface that allows configuration and modification of these rules (resource manager slave);
  one or several nodes that do perform functions for modification of incoming/outgoing data streams (flow modification1/2);
  one or several nodes that use and/or modify information contained in the data stream (function 1/2);
  a node or entity that controls/modifies the rules stored in the database (resource manager master).

The function of the packet data forwarding engine is very simple: packet header information of general ingress traffic will be analyzed (e.g. source, source/destination IP address, VPN encryption, etc.) and a rule is searched in the flow table. A rule may simply comprise information to which port this packet shall be forwarded. Packets will then be forwarded to the ports according to the rule. If no rule is found, packets may be forwarded to the general egress.

The functions of the other nodes either comprise simple flow modification functions (e.g. VPN en/decryption) or higher layer functions (applications) which may even completely change the information in the flow—they receive an incoming stream, analyze and/or modify it and put the result into an outgoing stream back to the packet data forwarding engine.

FIG. 9 shows an implementation example of some functions of gateways according to these principles. As may be seen from the figure, by this architecture, several gateway types like GGSN, SecGW, and BRAS may be combined into a single system.

In the centre, there is an OpenFlow enabled Ethernet switch. OpenFlow is an OpenSource standard which has been chosen for the implementation example due to its simplicity, however, any mechanism allowing control access to a data plane would do. The example bases on an Ethernet switch (layer 2), again due to its simplicity, however, the principles shown are valid for any layer.

The flow table can be modified via the OpenFlow protocol by any server that talks OpenFlow. Some exemplary functions are shown: PPP or PPPoE termination or handling (BRAS), VPN tunnel en/decryption (SecGW) and PDP context and DPI for the GGSN.

All incoming data from the RAN/DSL access network run through the general ingress port of the switch. If header analysis results in there is a PPP encapsulation, the according rule in the flow table is forwarding these packets (with a PPP encapsulation) to a port where a PPP handler is connected (PPPoE termination). The resulting outbound stream of this PPP handler is connected to another port of the switch, now the incoming stream has no encapsulated PPP frames. If header analysis of this new incoming stream results in that packets are VPN encrypted (e.g. because packets came from a femto base station, another rule will convey those packets to yet another handler which does decryption (SGW VPN en-decryption) and feeds its outgoing stream again to the switch. This stream again will be header-analyzed. Then another rule could imply that the target IP address of the packet requires deep packet inspection, e.g. to derive further billing information and so forth.

Finally, if no further rule is found, traffic will be conveyed to the general egress port (e.g. to/from internet exchange).

Due to this packet flow, the decomposition principle according to SDN is also named "service chaining".

The existing approaches to apply SDN are still too simple to address the problem of edge nodes properly. FIG. 5 shall help to illustrate the issue. Here is an example of how SDN could be applied to a typical network service scenario. At top level there is an application which uses two types of communication service, real time voice and best effort data. Imagine a shopping portal where you can browse in a shop while in parallel there is an ongoing voice over IP (VoIP) call with a hotline where you can ask questions. In a virtualized network, this application may request for connectivity to an SDN controller (which might be embedded in the application or not) using an abstract northbound interface. The request might comprise of "real time connection between A and B and best effort connection between A and C". The SDN controller might then configure one or several NEs, the figure shows the configuration of one specific node. This NE might be shared between several SDN-controllers so that a FlowVisor will allow manipulations only on ports 0, 1 and 2 for this SDN-controller.

The SDN controller might manipulate the accessible part of the flow table such that incoming traffic on port 0 (which might comprise of real time voice traffic and best effort data traffic from the user) will be analyzed. If header information contains indication that VoIP is used (e.g. real time transport protocol (RTP) header found) then traffic shall be forwarded to a high performance part of the network (which in the example is accessible through port 1). All other traffic shall be forwarded to port 2. This is a typical deployment scenario for SDN enabled nodes and here the dilemma of this approach becomes obvious: the separation into control and data forwarding made the NE turn into a stone stupid forwarding engine that only allows relaying data packets from one port to another without further manipulation. Because of this limitation, this sort of NE shall be further denoted as "NE class 0". This may be well suitable for pure transport packet transmission but not for relaying transport user data information that require specific interworking on the forwarding plane. Examples for necessary U-Plane data modifications are:

GPRS tunneling protocol (GTP) tunnel handling
Policy enforcement/traffic shaping
Encryption
State full interworking, i.e. making forwarding dependant on authentication Current SDN concepts do not properly address these issues. E.g., edge nodes like S-GW and P-GW require this functionality: S- and P-Gateways to handle GTP tunnels and P-Gateways do policy enforcement.

According to a further approach, NEs are amended with additional functionality beyond pure packet forwarding, such as tunnel handling capabilities. FIG. 6 shows a node (NE) which is able to handle tunnels. Tunnels in this context mean that data packets may enveloped in another frame with a tunnel header and with the tunnel having endpoints (node A, node B). Typical examples for tunnels are GTP tunnels (as used in mobile core networks) or PPPoE encapsulation (as used in fixed DSL networks).

The extensions of such an NE (which turns them into a so-called "class 1 NE") should comprise additional tunnelling rules that might be applied to tunnel types and/or ports. As an example, a NE shall terminate all GTP tunnels that come in through port 0, strip off tunnel frames and forward to port 1. In addition, all non-tunneled packets received through port 0 shall be supplied with tunnelling framings according to parameters given in the rules (e.g. tunnel end point address).

The SDN control protocol is thus be extended to allow transfer of tunnelling rules from the controller.

Correspondingly, a class 0 NE may be enhanced by capabilities of traffic shaping, policy enforcement, ciphering, deciphering, DPI, etc., or a combination of these capabilities. Accordingly, the SDN control protocol is extended to allow transfer of the corresponding rules from the controller. Different NEs connected to a SDN controller may belong to different classes (have different capabilities).

From an abstract point of view, thus, the functionality of a gateway is decomposed into three parts:

A: Application part (e.g. S-GW-App, P-GW-App). This comprises e.g. all signaling functions. Generally speaking, the application part is the software that interfaces logically to other signaling entities, i.e., an S-GW-App will communicate logically with mobility management entity (MME), eNodeB, and/or home subscriber server (HSS). Most preferably, the application part is designed in a way that it can run on top of a virtual machine in the cloud—then it may be added as another application running in the cloud alongside with MME, HSS and else.

C: Control Part (e.g. S-GW-Ctrl, P-GW-Ctrl). This is the control part (SDN-control) that has been stripped off the existing S-GW/P-GW node. It is used to steer the transport resources as described hereinabove. Most preferably, the control part is designed as an extension of an existing overall network controller—then it may be added to the SDN controller—or it simply is the SDN controller.

F: Network Element Part or Forwarding part (e.g. S-GW-NE, P-GW-NE). This is the data forwarding part of the formerly monolithic gateway node. It follows the principles of SDN (i.e. it can be steered by an SDN controller). Most preferably it is equipped with the adequate extensions described in chapter 4.

Accordingly, an architecture of a network element decomposed according to these principles is named A-C-F separation.

SUMMARY OF THE INVENTION

It is an object of the present invention to improve the prior art. In detail, it is an object to overcome at least some of the problems due to A-C-F separation.

According to a first aspect of the invention, there is provided an apparatus, comprising at least one enhanced function block and at least one stateless function block; main routing means adapted to route, based on a header of a data packet and an incoming port on which the data packet was received, the data packet to one of the at least one enhanced function blocks and the at least one stateless function blocks, wherein the data packet comprises the header and a payload; wherein each of the at least one enhanced function blocks comprises providing means adapted to provide a respective information comprised in the data packet to a respective control device; an enhanced function means adapted to execute a respective enhanced function on the data packet to obtain a respective first processed data packet addressed to a respective destination address, wherein the respective enhanced function is based on a respective instruction for the data packet received in response to the provided information; and a first routing means adapted to route the respective first processed data packet to the respective destination address; and each of the at least one stateless function blocks comprises a stateless function means adapted to execute a respective stateless function on the data packet, wherein the respective stateless function is not based on a respective instruction for the data packet received in response to providing respective information comprised in the data packet to a respective control device, in order to, thus, obtain a respective second processed data packet; and returning means adapted to return the respective second processed data packet to the main routing means.

In the apparatus, at least one of, if the apparatus comprises a further enhanced function means adapted to execute a further enhanced function on the data packet received from the main routing means to obtain a further first processed data packet addressed to a further destination address, wherein the further enhanced function is based on a further instruction for the data packet received in response to providing a further information comprised in the data packet to a further control device, then the further enhanced function means may be an enhanced function means of at least one of the at least one enhanced function blocks; and, if the apparatus comprises a further stateless function means adapted to execute a further stateless function on the data packet received from the main routing means to obtain a further second processed data packet, wherein the stateless function is not based on a further instruction for the data packet received in response to providing respective information comprised in the data packet to a respective control device, then the further stateless function means may be a stateless function means of at least one of the at least one stateless function blocks.

In the apparatus, the enhanced function may comprise at least one of an enhanced modification of the payload, an enhanced usage of information comprised in the payload, and a generation of the destination address.

In the apparatus, the stateless function may comprise at least one of a stateless modification of the payload and a stateless usage of information comprised in the payload.

In the apparatus, the main routing means may be adapted to route the data packet based on the header, the incoming port, and a stored flow table, wherein the flow table defines a correlation between the incoming port and an outgoing port to which the respective one of the at least one enhanced function blocks and the at least one stateless function blocks is connected.

In the apparatus, at least one of the at least one enhanced function may comprise at least one of tunneling handling and policy enforcement, and the at least one stateless function may comprise at least one of deep packet inspection, ciphering, and charging.

The apparatus may further comprise the respective at least one control device, wherein the at least one control device provides at least one of a broadband remote access server function, a security gateway function, and a gateway general packet radio service support node function.

In the apparatus, the main routing means may be adapted to analyze the respective header of at least one of the first processed data packet and the second processed data packet and to route the at least one of the first processed data packet and the second processed data packet based on the analysis of the respective header.

In the apparatus, the control device may provide the broadband remote access server function and the security gateway function, the enhanced function block and the stateless function block may comprise respective enhanced function means and stateless function means related to the broadband remote access server function and the security gateway function, and the main routing means may be adapted to analyze if a first processed data packet or a second processed data packet received from a respective enhanced function block and a stateless function block related to the security gateway function is related to plain internet traffic, and to route the received first processed data packet or second processed data packet to a first destination address comprised in the data packet.

According to a second aspect of the invention, there is provided an apparatus, comprising at least one enhanced function block and at least one stateless function block; main routing processor adapted to route, based on a header of a data packet and an incoming port on which the data packet was received, the data packet to one of the at least one enhanced function blocks and the at least one stateless function blocks, wherein the data packet comprises the header and a payload; wherein each of the at least one enhanced function blocks comprises providing processor adapted to provide a respective information comprised in the data packet to a respective control device; an enhanced function processor adapted to execute a respective enhanced function on the data packet to obtain a respective first processed data packet addressed to a respective destination address, wherein the respective enhanced function is based on a respective instruction for the data packet received in response to the provided information; and a first routing processor adapted to route the respective first processed data packet to the respective destination address; and each of the at least one stateless function blocks comprises a stateless function processor adapted to execute a respective stateless function on the data packet, wherein the respective stateless function is not based on a respective instruction for the data packet received in response to providing respective information comprised in the data packet to a respective control device, in order to, thus, obtain a respective second processed data packet; and returning processor adapted to return the respective second processed data packet to the main routing processor.

In the apparatus, at least one of, if the apparatus comprises a further enhanced function processor adapted to execute a further enhanced function on the data packet received from the main routing processor to obtain a further first processed data packet addressed to a further destination address, wherein the further enhanced function is based on a further instruction for the data packet received in response to providing a further information comprised in the data packet to a further control device, then the further enhanced function processor may be an enhanced function processor of at least one of the at least one enhanced function blocks; and, if the apparatus comprises a further stateless function processor adapted to execute a further stateless function on the data packet received from the main routing processor to obtain a further second processed data packet, wherein the stateless function is not based on a further instruction for the data packet received in response to providing respective information comprised in the data packet to a respective control device, then the further stateless function processor may be a stateless function processor of at least one of the at least one stateless function blocks.

In the apparatus, the enhanced function may comprise at least one of an enhanced modification of the payload, an enhanced usage of information comprised in the payload, and a generation of the destination address.

In the apparatus, the stateless function may comprise at least one of a stateless modification of the payload and a stateless usage of information comprised in the payload.

In the apparatus, the main routing processor may be adapted to route the data packet based on the header, the incoming port, and a stored flow table, wherein the flow table defines a correlation between the incoming port and an outgoing port to which the respective one of the at least one enhanced function blocks and the at least one stateless function blocks is connected.

In the apparatus, at least one of the at least one enhanced function may comprise at least one of tunneling handling and policy enforcement, and the at least one stateless function may comprise at least one of deep packet inspection, ciphering, and charging.

The apparatus may further comprise the respective at least one control device, wherein the at least one control device provides at least one of a broadband remote access server function, a security gateway function, and a gateway general packet radio service support node function.

In the apparatus, the main routing processor may be adapted to analyze the respective header of at least one of the first processed data packet and the second processed data packet and to route the at least one of the first processed data packet and the second processed data packet based on the analysis of the respective header.

In the apparatus, the control device may provide the broadband remote access server function and the security gateway function, the enhanced function block and the stateless function block may comprise respective enhanced function processor and stateless function processor related to the broadband remote access server function and the security gateway function, and the main routing processor may be adapted to analyze if a first processed data packet or a second processed data packet received from a respective enhanced function block and a stateless function block related to the security gateway function is related to plain internet traffic, and to route the received first processed data packet or second processed data packet to a first destination address comprised in the data packet.

According to a third aspect of the invention, there is provided a method, comprising routing, based on a header of a data packet and an incoming port on which the data packet was received, the data packet to one of at least one enhanced function block and at least one stateless function block, wherein the data packet comprises the header and a payload; wherein if the data packet is routed to one of the at least one enhanced function blocks, the method performs providing a respective information comprised in the data packet to a respective control device; executing a respective enhanced function on the data packet to obtain a respective first processed data packet addressed to a respective destination address, wherein the respective enhanced function is based on a respective instruction for the data packet received in response to the provided information; and routing the respective first processed data packet to the respective destination address; and, if the data packet is routed to one of the at least one stateless function blocks, the method performs executing a respective stateless function on the data packet, wherein the respective stateless function is not based on a respective instruction for the data packet received in response to providing respective information comprised in the data packet to a respective control device, in order to, thus, obtain a respective second processed data packet; and returning the respective second processed data packet to the main routing means.

In the method, at least one of, if the method executes a further enhanced function on the data packet received from the main routing means to obtain a further first processed data packet addressed to a further destination address, wherein the further enhanced function is based on a further instruction for the data packet received in response to providing a further information comprised in the data packet to a further control device, then the method may perform routing the further first processed data packet to the destination address; and, if the method executes a further stateless function on the data packet received from the main routing means function to obtain a further second processed data packet, wherein the stateless function is not based on a further instruction for the data packet received in response to providing respective information comprised in the data packet to a respective control device, then the method may perform returning the further second processed data packet to the main routing means.

In the method, the enhanced function may comprise at least one of an enhanced modification of the payload, an enhanced usage of information comprised in the payload, and a generation of the destination address.

In the method, the stateless function may comprise at least one of a stateless modification of the payload and a stateless usage of information comprised in the payload.

In the method, the routing of the data packet may be based on the header, the incoming port, and a stored flow table, wherein the flow table defines a correlation between the incoming port and an outgoing port to which the respective one of the at least one enhanced function blocks and the at least one stateless function blocks is connected.

In the method, at least one of the at least one enhanced function may comprise at least one of tunneling handling and policy enforcement, and the at least one stateless function may comprise at least one of deep packet inspection, ciphering, and charging.

The method may further comprise providing at least one of a broadband remote access server function, a security gateway function, and a gateway general packet radio service support node function.

The method may further comprise analyzing the respective header of at lest one of the first processed data packet and the second processed data packet and routing the at least one of the first processed data packet and the second processed data packet based on the analysis of the respective header.

The method may further comprise providing the broadband remote access server function and the security gateway function, executing at least one of an enhanced function and a stateless function related to the broadband remote access server function and the security gateway function, and analyzing if a first processed data packet or a second processed data packet received from a respective enhanced function and a stateless function related to the security gateway function is related to plain internet traffic, and routing the received first processed data packet or second processed data packet to a first destination address comprised in the data packet.

The method of the third aspect may be a method of network consolidation.

According to a fourth aspect of the invention, there is provided an apparatus comprising at least one processor and
   at least one memory including computer program code,
      wherein the at least one processor, with the at least one memory and the computer program code, is arranged to cause the apparatus to at least perform the method of the third aspect.

According to a fifth aspect of the invention, there is provided a computer program product comprising a set of instructions which, when executed on an apparatus, is configured to cause the apparatus to carry out the method according to the third aspect. The computer program product may be embodied as a computer-readable medium or directly loadable into a computer.

According to some embodiments of the invention, at least one of the following advantages may be achieved:
   capital expenditure is reduced;
   complexity of functional nodes is reduced;
   performance requirements may be tailored to each entity;
   new functions may be easily employed;
   existing functions may be easily modified;
   commercially of the shelf (COTS) products may be used.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

As shown hereinabove, a network element, such as an edge node (GGSN, SecGW, RNC, BRAS, etc.) but not limited to edge nodes, may be decomposed either according to SDN (service chaining), or according to A-C-F separation. In detail, each function of the respective network element may be embodied as a separate entity as according to service chaining, or may enhance the forwarding engine as according to A-C-F separation.

According to some embodiments of the invention, some functions of a network element are decomposed according to the principle of service chaining and some according to the principle of A-C-F separation. That is, a network element according to an embodiment of the invention has a mixed configuration.

Figure 10:
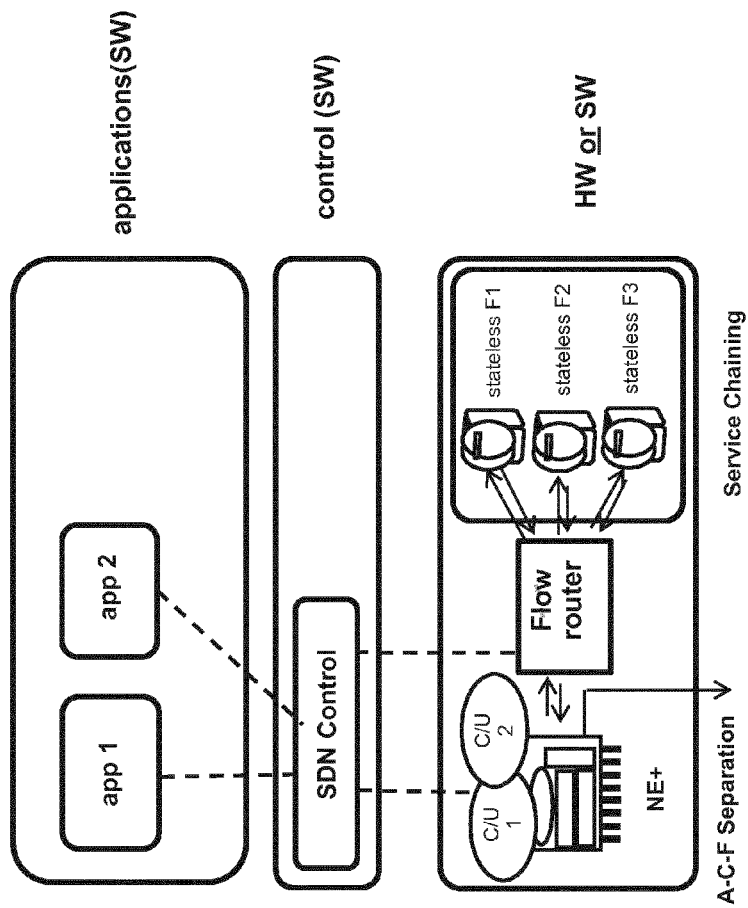
FIG. 10 shows a network element according to an embodiment of the invention.

FIG. 10 shows a network element according to an embodiment of the invention.

The flow router is a forwarding router or switch. It analyzes headers of incoming packets and forwards them to specific ports according to some rules which may be implemented in a flow table. Although not shown in FIG. 10, the flow router may also receive data packets from outside the apparatus and forward data packets to the outside. The flow router may analyze the header of a data packet regardless of whether it is received from one of the NE+ and stateless functions of the apparatus or from the outside but may take into account the port on which the data packet is received. In this context, the term "stateless" refers to functions of the apparatus that do not have a stateful context with other entities outside this apparatus whereas those functions themselves may well be stateful within said apparatus.

Preferably, the flow table is administered by SDN using a protocol like OpenFlow or ForCES. However, in some embodiments, the flow table is fully or partly preconfigured, or it may be configured via other protocols.

Which of the rules is to be applied to a packet is based on information comprised in the header of the data packet (such as destination address, encapsulation, protocol type, etc.) and the port through which the data packet enters into the flow router.

On the left side of FIG. 10, it is shown how functions of the NE are decomposed according to A-C-F separation. I.e., NE+ designates a network element comprising another routing function and, in addition, some specific functionality like tunnelling or policy enforcement. These functions are designated as C/U 1 and C/U 2, wherein C/U indicates that NE+ comprises both: a specific part of the control plane and user plane. The number of functions is not limited to two, but may be any natural number equal to or larger than 1.

NE+ is controlled by SDN control, as explained in the prior art section. SDN control may be based on one or more HW and SW entities. E.g., control of the flow router may be implemented separately or jointly with control of NE+.

In the application part on top, two exemplifying applications are shown which use the functionality of NE+. In particular, they may use the functions of C/U1 and C/U2. Furthermore, they may modify the address to which the data packet, after it has been processed by NE+ will be forwarded. The number of applications is not limited to two but may be any natural number equal to or larger than 0. I.e., in some embodiments, there is no application on top of SDN control.

The application part corresponds to the application part as described in the prior art. It comprises e.g. signaling functions. Generally speaking, the application part is the software that interfaces logically to other signaling entities, i.e., an S-GW-App will communicate logically with mobility management entity (MME), eNodeB, and/or home subscriber server (HSS).

If a data packet is processed by NE+, some information is retrieved from the data packet which may result in providing it to SDN control (e.g. in case of tunnel setup), which may, in some embodiments, forward a further information based on the retrieved information to an application. In the latter case, the application may provide some instructions to SDN control. Either based on its own control logic or (additionally) based on the instruction received from the application, SDN control instructs NE+ how to handle the received data packet. In particular, based on these instructions, NE+ may route the processed data packet back to the flow router for further processing or to a different destination.

Note that for some data packets being processed by NE+, NE+ does not have to interwork with SDN control. E.g., if a tunnel such as a GTP tunnel is set up, typically, tunnel parameters have already been provided from the controller to the NE+ beforehand, or, if not, the first packet received will involve SDN control for obtaining tunnel parameters like tunnel endpoint ID (TEID), while the following packets of the data stream are encapsulated in the tunnel framing, wherein NE+ uses the obtained TEID autonomously, i.e. without again contacting SDN.

In FIG. 10, only 1 NE+ (with two additional functions C/U1 and C/U2) is shown. However, the number is not limited to 1 but may be any natural number equal to or larger than 1. Each NE+ is connected to a respective specific port of the flow router.

On the right side of FIG. 10, some functions ("stateless F1" to "stateless F3") are shown, where decomposing according to service chaining is made. The number is not limited to three but may be any natural number equal to or larger than 1. The stateless functions are connected to a respective specific port of the flow router, process the data packet and return the processed data packet back to (another) specific port of the flow router. They do not comprise a routing capability (except for returning the data flow). Furthermore, they do not interwork with a higher layer control function like SDN control.

That is, in embodiments of the invention, some functions which require interworking with a higher layer control (and/or application) are decomposed according to A-C-F separation, and for these functions, NE+ provides routing capabilities. On the other hand, some (stateless) functions, which do not require interworking with a higher layer control (and/or application) are decomposed according to service chaining, and the entity (HW/SW) performing such stateless function does not provide a routing capability.

Figure 5:
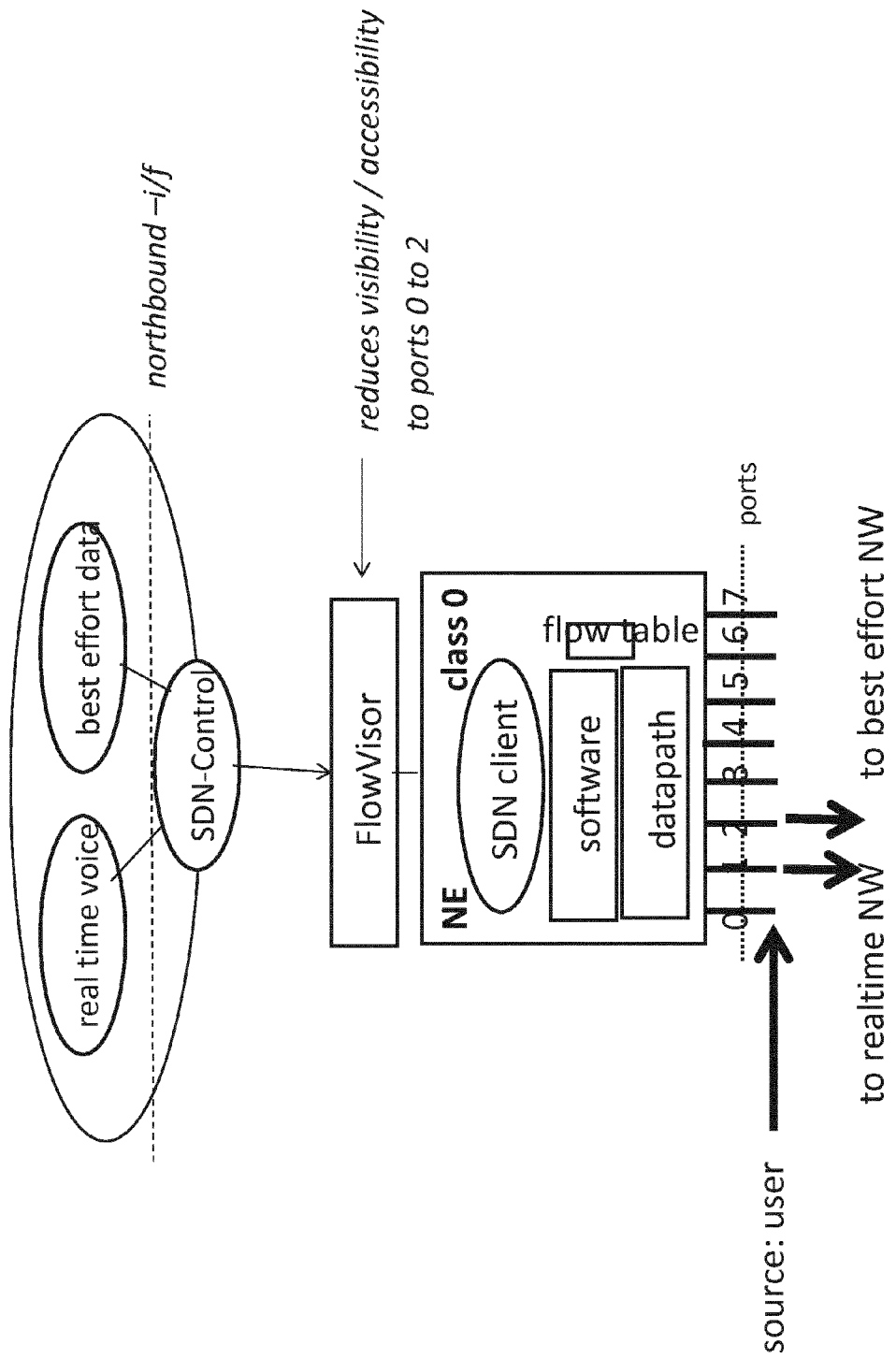
FIG. 5 illustrates the problem of applying SDN to edge nodes.
Figure 6:
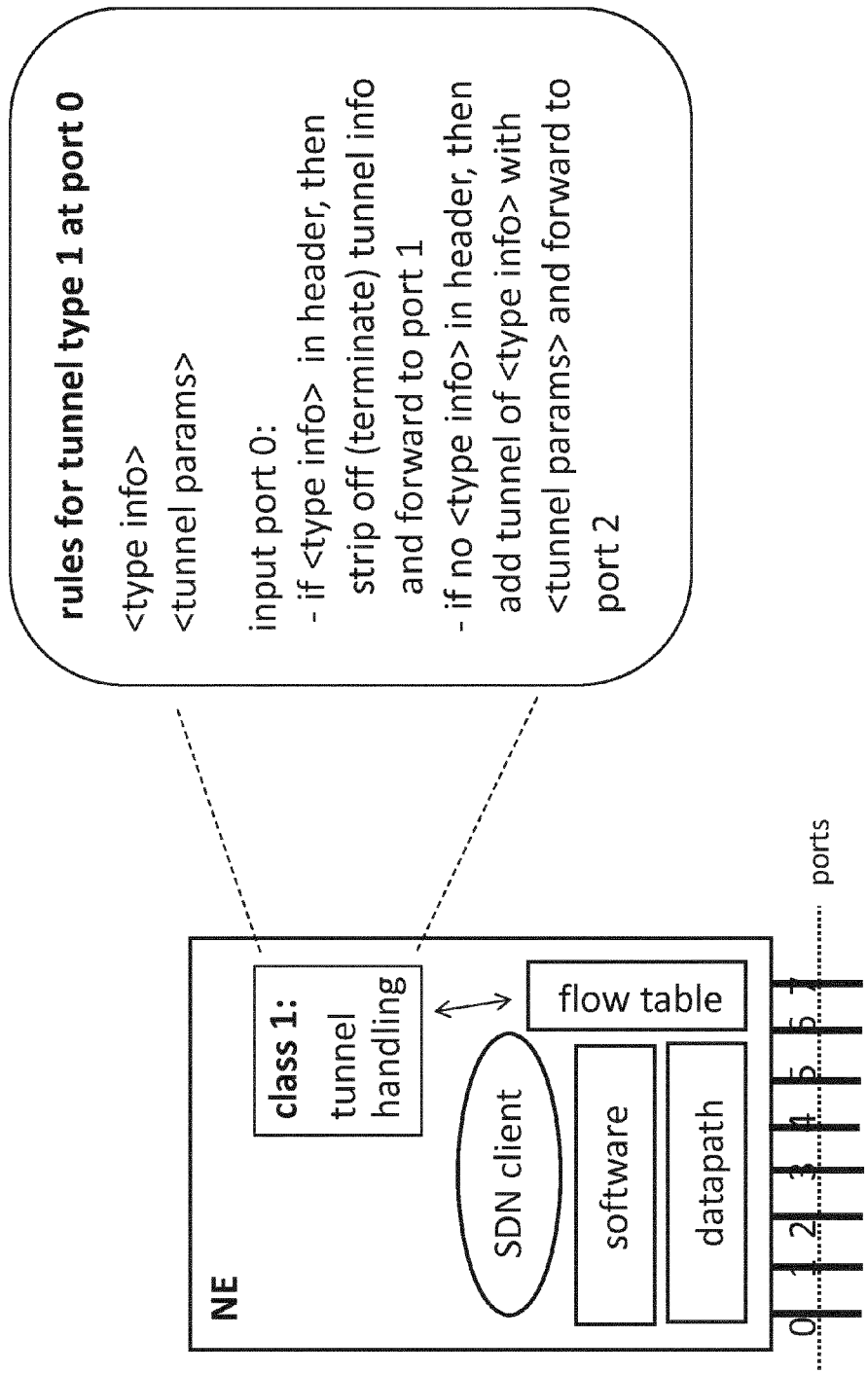
FIG. 6 shows a class 1 NE+ according to A-C-F separation.
Figure 7:
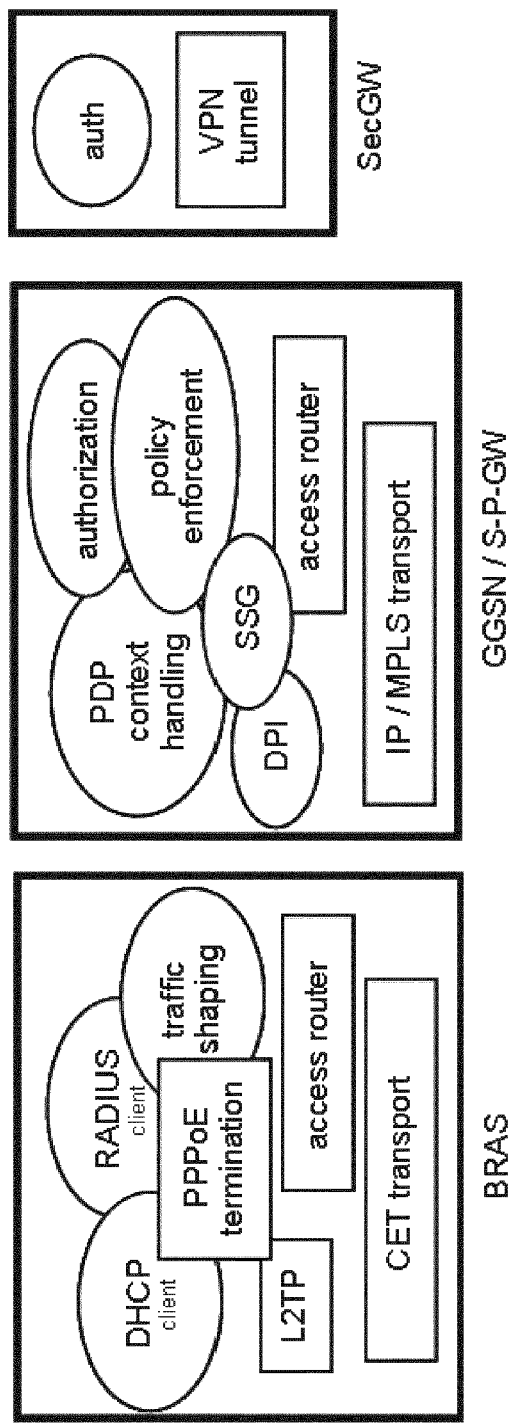
FIG. 7 shows some functions of BRAS, GGSN, and SecGW.
Figure 8:
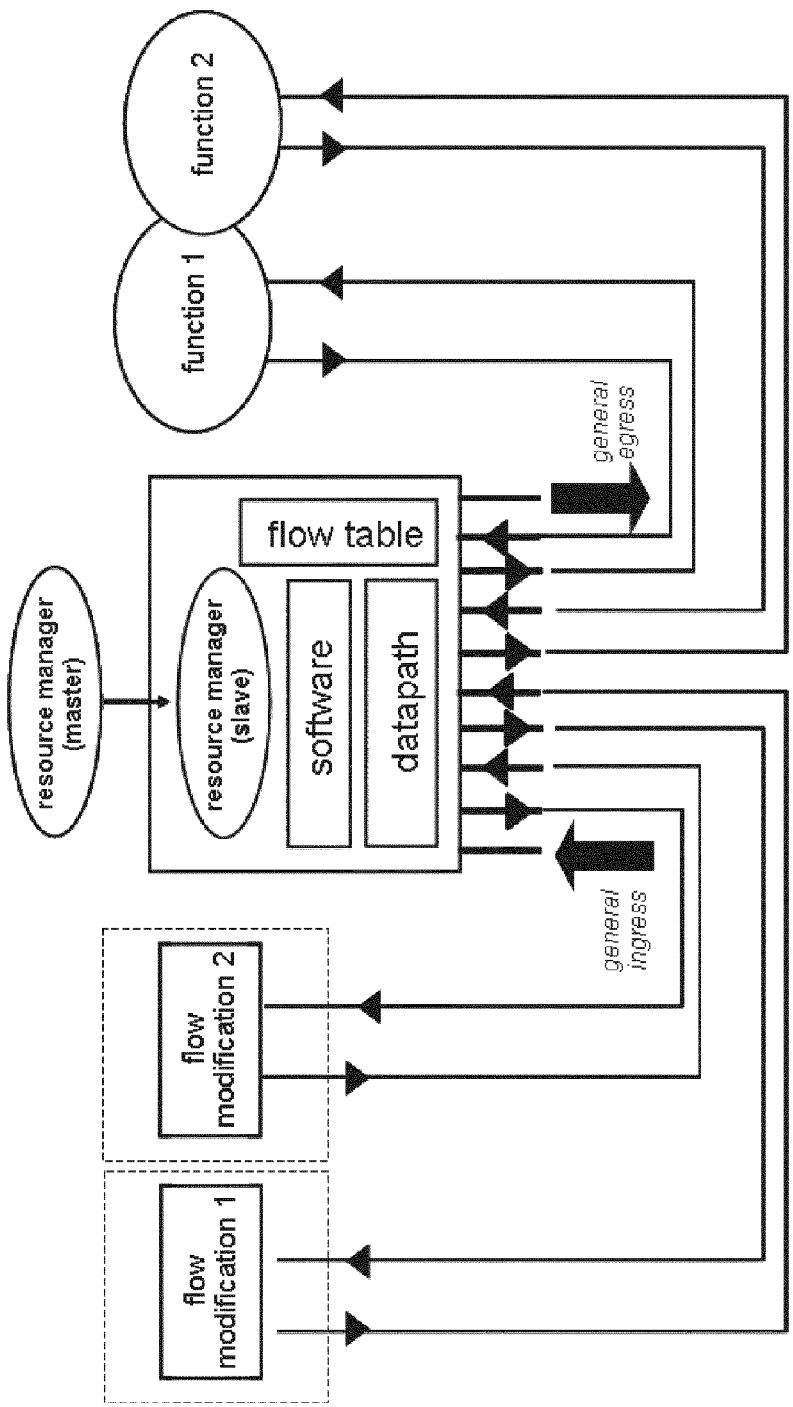
FIG. 8 shows a decomposition of a general network element according to principles of service chaining.
Figure 9:
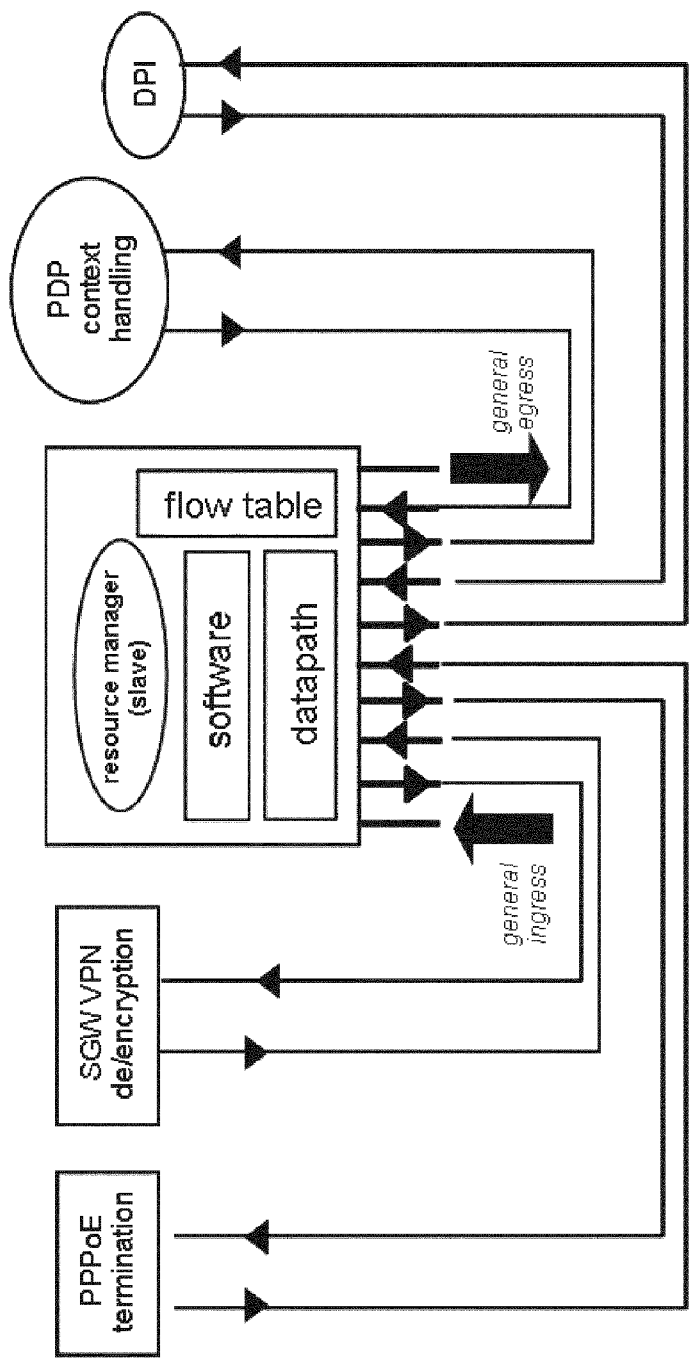
FIG. 9 shows a decomposition of a general gateway according to principles of service chaining.

Thus, the functions are appropriately decomposed. Functions which require interworking with higher layers are implanted in the transport plane. Thus, the problem of SDN discussed with respect to FIG. 5 is overcome. On the other hand, (stateless) functions which do not require interworking with higher layers are performed by dedicated (virtual or physical) machines. E.g., they may be executed by specialized hardware, particularly designed for the specific stateless function. In some embodiments, the resources used for stateless functions may be pooled.

Preferably, all functions of an NE requiring interworking with higher layers are implemented as NE+, and all functions of the NE not requiring interworking with higher layers are implemented as stateless functions according to service chaining.

The performance for each function may be scaled separately, e.g. by adding further NE+ or expanding NE+ of the respective function, or by adding further (virtual or physical) machines or expanding the (virtual or physical) machine of a stateless function.

Examples of functions which require interworking with higher layers and may be, thus, implemented in NE+ (according to A-C-F separation) are tunnelling (GTP, PPP, PPPoE, VPN), traffic shaping, and policy enforcement (PE). For example, if a tunnel is to be set up, tunnel endpoint identifier (TEID) must be known to the function, and this has to be agreed by signaling on higher layers. Also, higher layers may indicate parameters for traffic shaping and policy enforcement, respectively.

Examples of functions which do not require interworking with higher layers and may be, thus, implemented as stateless functions (according to service chaining) are DPI, (de-)ciphering, and charging/accounting. For example, patterns to be searched for may be predefined for DPI. Ciphering keys may be preconfigured. E.g., one key or a set of key may be preconfigured in the ciphering function and its counter part in another network element, or an algorithm to generate the ciphering key from known parameters such as time, destination address, origin address may be predefined. However, if the ciphering key (or parameters to generate the ciphering key) are exchanged through higher layers, (de-)ciphering function should preferably be implemented in NE+ (according to A-C-F separation).For charging/accounting, e.g. the number of packets may be counted and Charging Data Records (CDR) may be generated accordingly.

Figure 11:
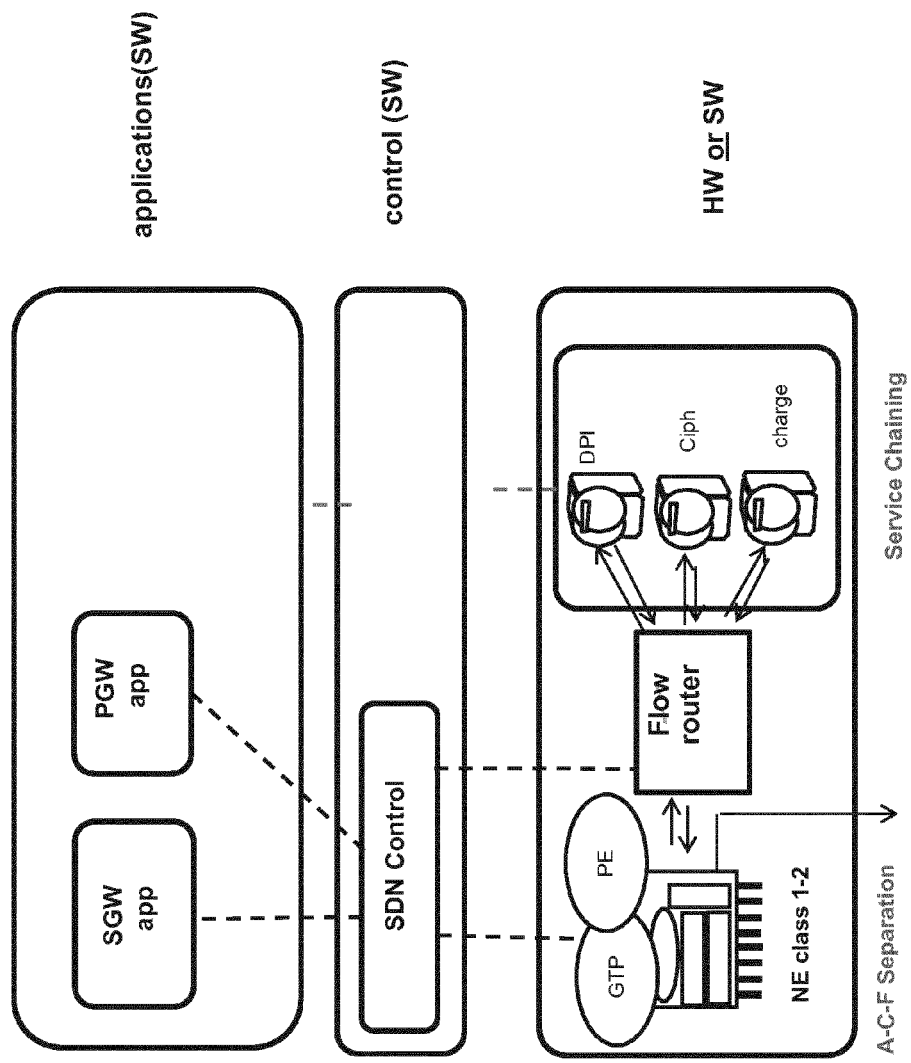
FIG. 11 shows a GGSN according to an embodiment of the invention.

FIG. 11 shows an embodiment of the invention. FIG. 11 corresponds to FIG. 10, and only the specifics of FIG. 11 are explained hereinafter.

The embodiment of FIG. 11 exemplifies some functions of a GGSN. S-GW and P-GW applications related to the signaling are in the top layer (application layer). By NE+ (here named NE class 1-2), and controlled by S-GW and P-GW applications through SDN control, GTP handling and policy enforcement are performed. While in the present example, both functions are based on the same routing device, there may be separate routing devices for each of these functions.

On the service chaining side of the flow router, DPI, ciphering, and charging are shown as stateless functions.

In embodiments of the invention, functions of mobile networks and fixed networks may be combined. E.g., a single network element (which may be composed of several HW components or even virtualized), may provide the functions of e.g. a BRAS of a fixed network, and SecGW and GGSN of a mobile network. Thus, an ping-pong arising e.g. for some traffic from Home eNB (HeNB) may be avoided if both, fixed network and mobile network belong to the same operator.

Figure 1:
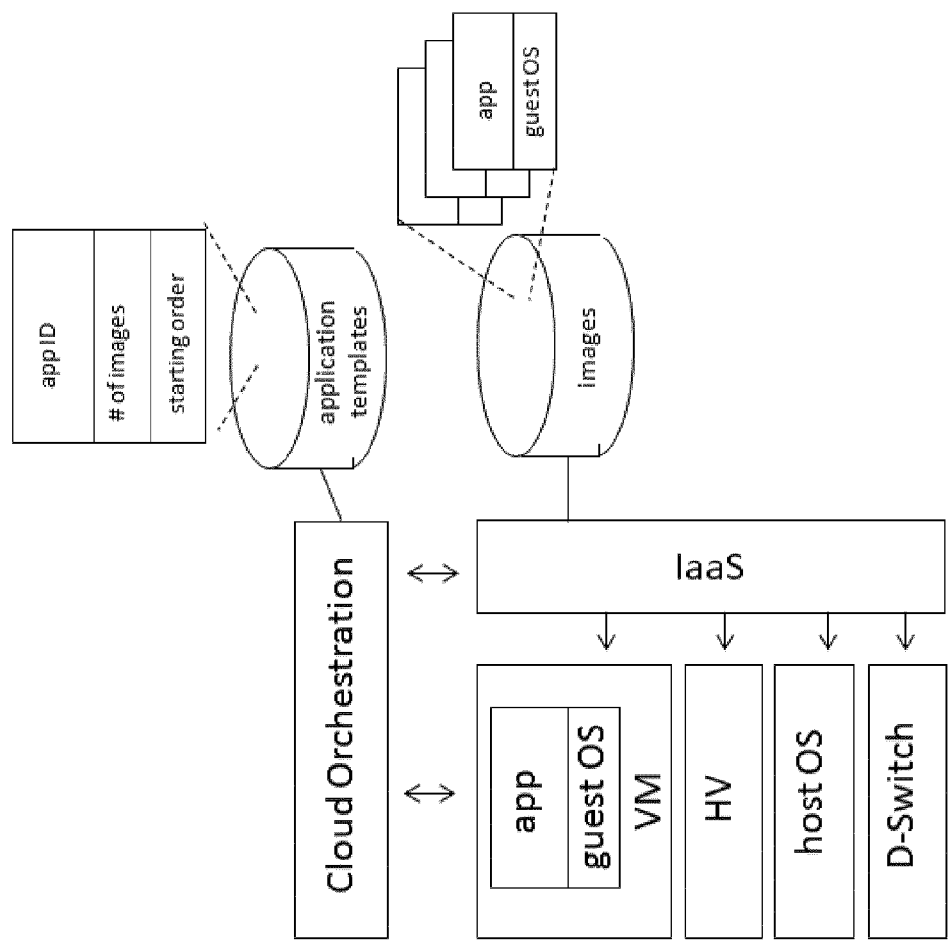
FIG. 1 shows a setup of a data center.
Figure 2:
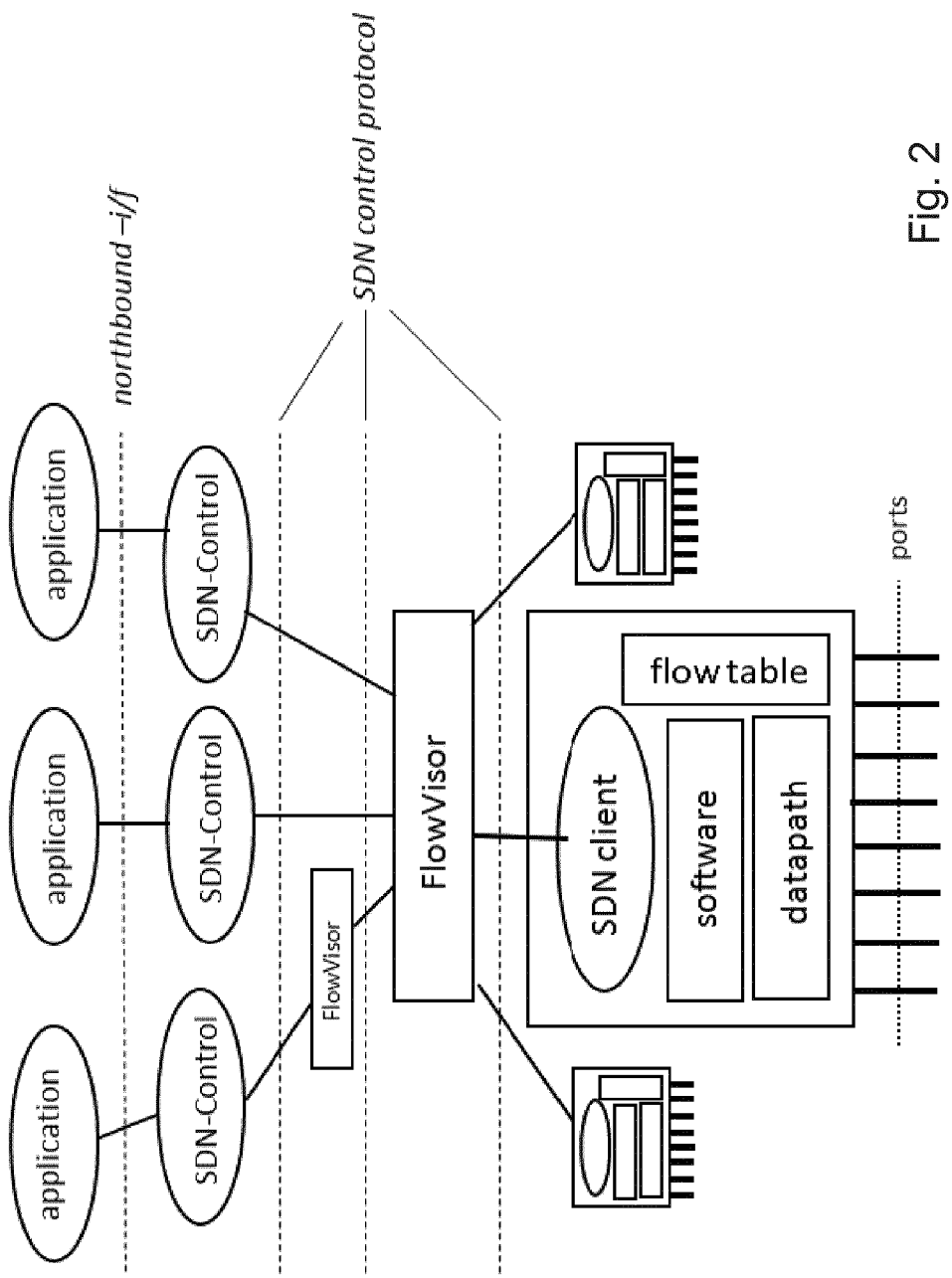
FIG. 2 describes some principles of SDN.
Figure 3:
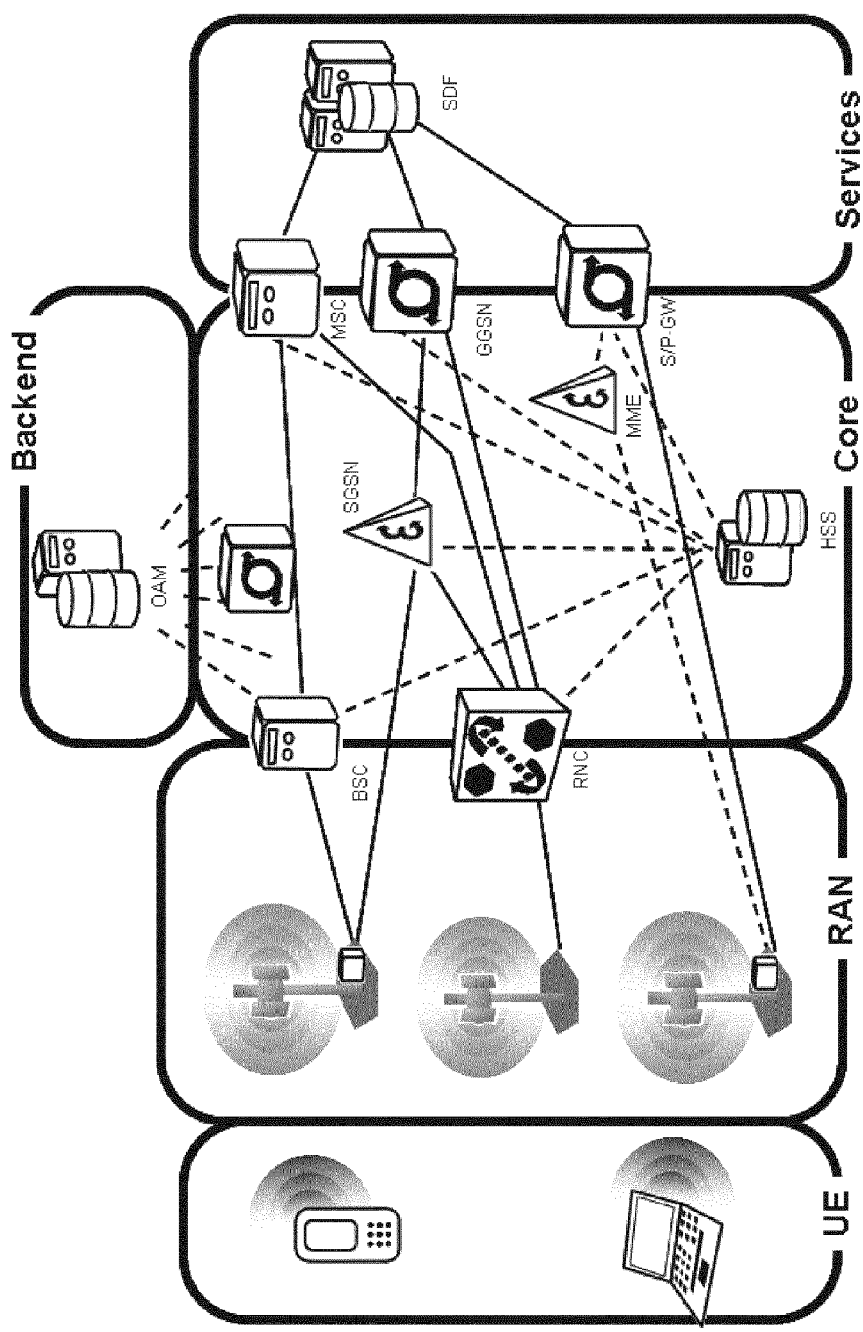
FIG. 3 shows a basic architecture of a mobile network.
Figure 4:
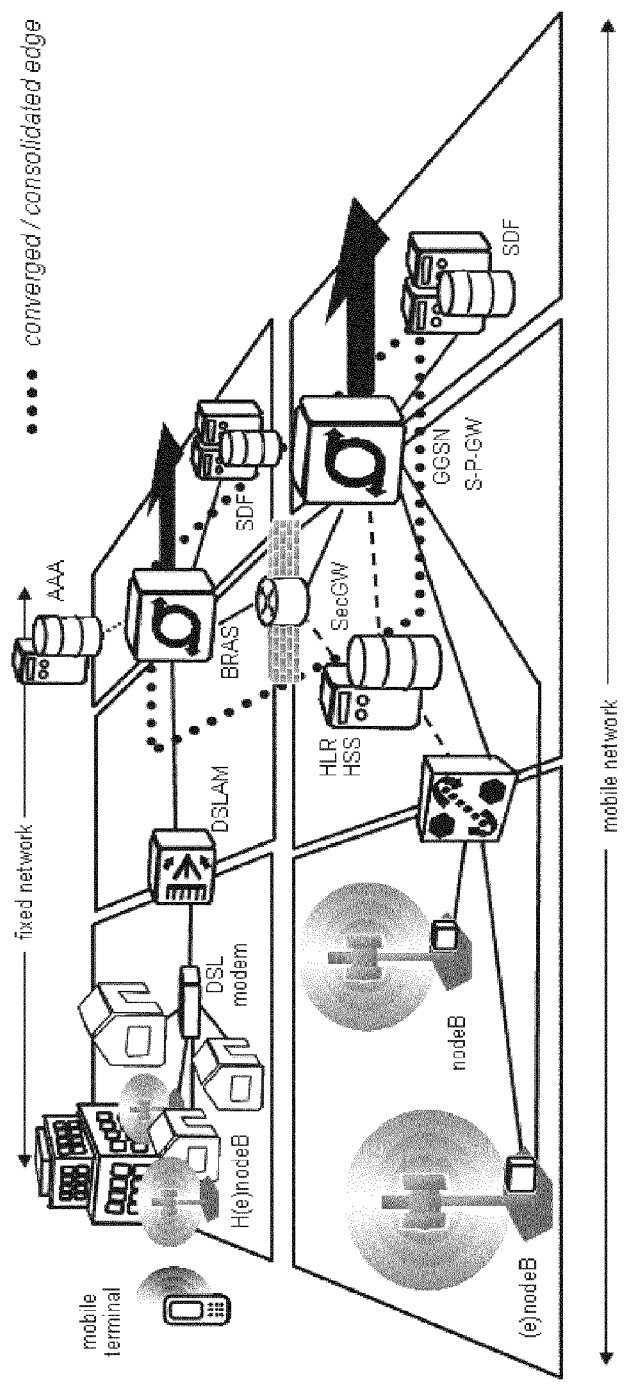
FIG. 4 shows a basic architecture of a mobile network and a fixed broadband network which may be operated by a same operator.
Figure 12:
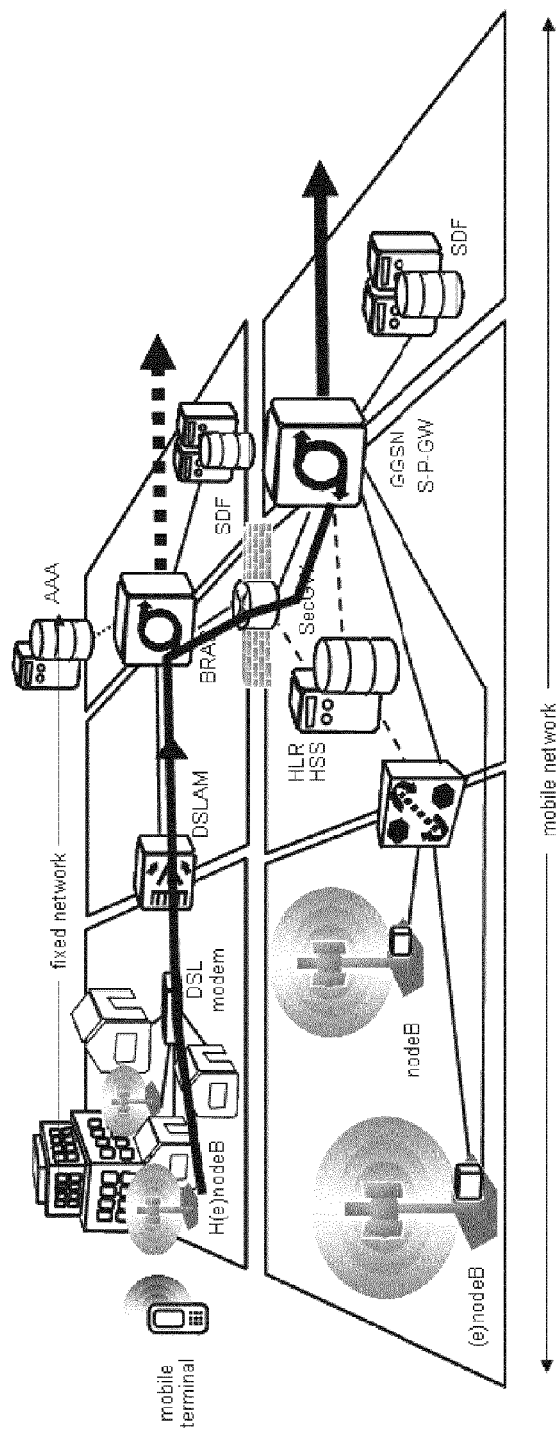
FIG. 12 shows a data flow in a mobile network and fixed network according to FIG. 4.

In detail, the thick lines in FIG. 12 show a conventional call flow involving a HeNB. The network is the same as shown in FIG. 4. A cellular terminal is doing a call/connection with an internet service, e.g. watching a YouTube video via the home based H(e)NodeB which topologically belongs to the mobile network of an operator and which is connected via the DSL network of the fixed network branch of said operator. Plain internet access is considered to be "low value" traffic, i.e. no further charging on top of the plain connectivity (which may be covered by a mobile data flat rate already) is applied to this service. Thus, this traffic should best be offloaded to the internet at any suitable point in the network, as shown be the dashed arrow outgoing from BRAS. However, since traffic is VPN encrypted with the VPN server (SecGW) being located in the mobile network, it has to pass through the BRAS to the SecGw of the mobile network and further on to the GGSN/S-P-GW. Here it will be detected that it is "low value" traffic and passed to/received from the internet. From the view of the operator (who runs both networks) traffic is tresspassing twice a network edge putting load onto two nodes (BRAS, GGSN) which already suffer performance wise—passing this edge only once would be the right thing here.

If a network element according to an embodiment of the invention comprises the functions of BRAS, SecGW, and GGSN (i.e. of the converged/consolidated edge according to FIG. 4), the flow router may first pass the data to BRAS functionality, then to SecGW functionality, and then to GGSN functionality, without trespassing a network edge. Only after GGSN functionality is processed, the traffic is trespassing from the network to the internet. Depending of whether the "last" GGSN function applied to the data packet is A-C-F separated or service chained, it is either passed to the internet from a corresponding NE+ or from the flow router.

If a network element according to an embodiment of the invention comprises at least the functions of BRAS and SecGW, processing of the data packet in the above scenario may be even further reduced. After the flow router receives a packet back from SecGW function, it may recognize that the packet is related to plain internet access and that the mobile belongs to the mobile network (as home network) of the same operator. Then, the flow router may pass the data packet directly to the internet, without involving GGSN functions. Thus, basically, the desired traffic flow as indicated by the dashed arrow in FIG. 12 is achieved (with an additional loop through SecGW function).

Note that the flow router substantially is a simple forwarding device (to which flow rules may be applied) such that sufficient performance of the flow router may be easily provided.

Correspondingly, with such a combined network element, there is no need for trespassing a network edge if a UE attached to a first HeNB calls another UE connected to a second HeNB (which might be connected to a different DSLAM of the same operator).

Figure 13:
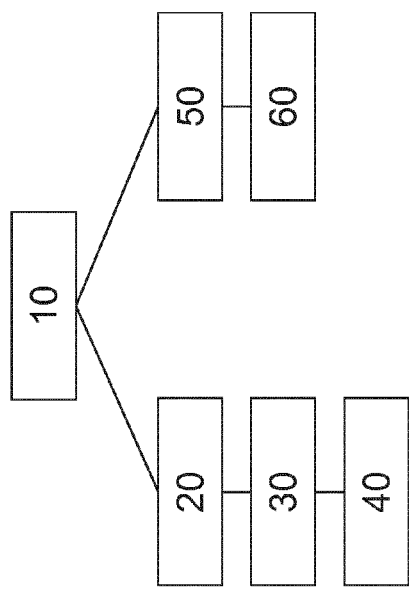
FIG. 13 shows an apparatus according to an embodiment of the invention.
Figure 14:
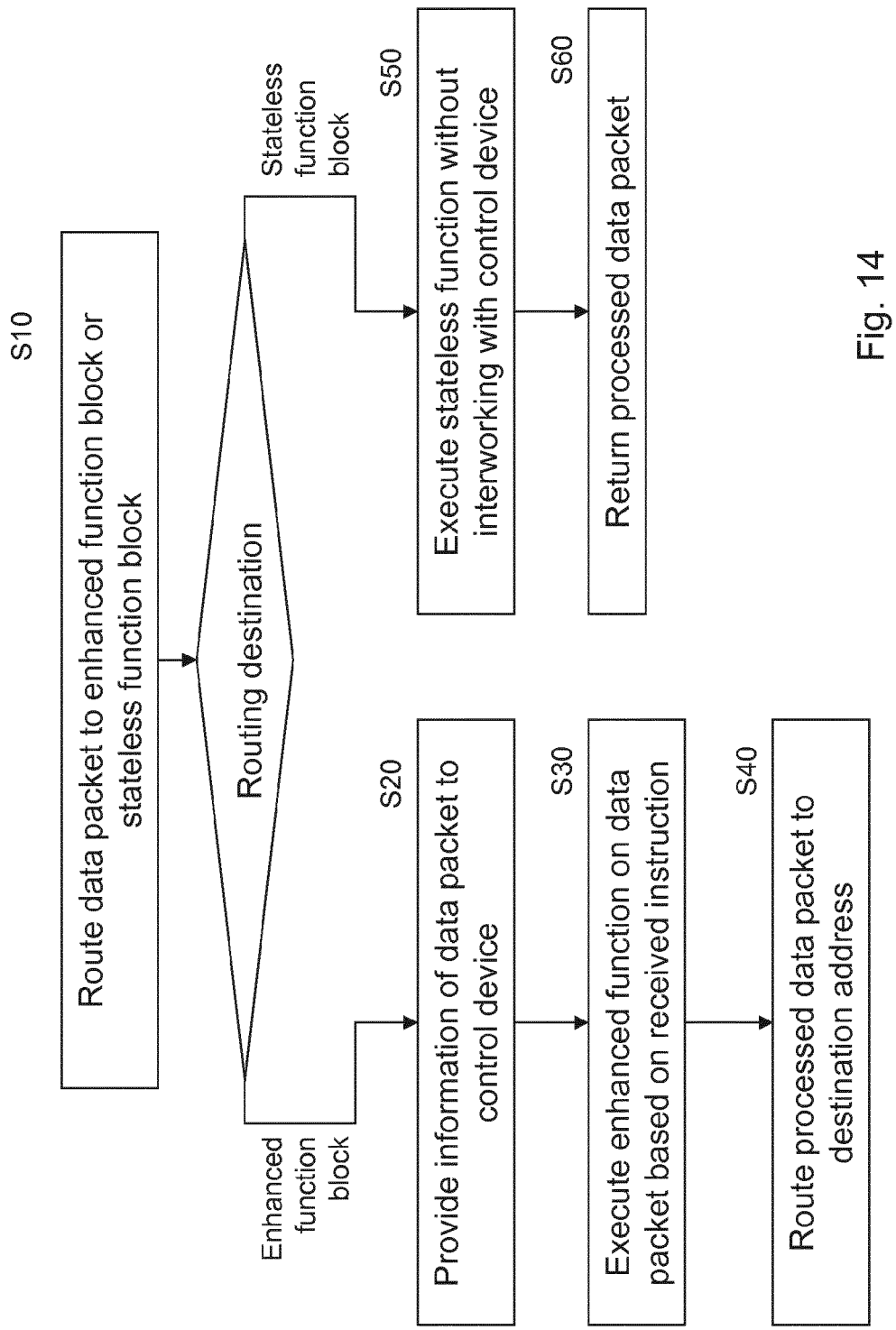
FIG. 14 shows a method according to an embodiment of the invention.

FIG. 13 shows an apparatus according to an embodiment of the invention. The apparatus may be a network element or an element thereof. FIG. 14 shows a method according to an embodiment of the invention. The apparatus according to FIG. 13 may perform the method of FIG. 14 but is not limited to this method. The method of FIG. 14 may be performed by the apparatus of FIG. 13 but is not limited to being performed by this apparatus.

The apparatus comprises main routing means 10, an enhanced function block, and a stateless function block. The enhanced function block comprises providing means 20, enhanced function means 30, and first routing means 40. The stateless function block comprises stateless function means 50 and returning means 60. For simplicity of explanation, only one enhanced function block and one stateless function block are shown. However, each of the number of enhanced function blocks and the number of stateless function blocks is not limited to one and may be any natural number equal to or larger than 1.

The main routing means 10 routes the data packet to one of the enhanced function block and the stateless function block (S10). The data packet comprises a header and a payload. The routing is based on the header and an incoming port on which the data packet was received by the main routing means.

If the main routing means routes the data packet to the enhanced function block, the functions of the components of the enhanced function block are executed on the data packet. If the main routing means routes the data packet to the stateless function block, the functions of the components of the stateless function block are executed on the data packet.

That is, if the data packet is routed to the enhanced function block, the providing means 20 provides an information comprised in the data packet to a control device (S20). In response to the provided information, an instruction is received for the data packet. That is, in other words, if the data packet is routed to the enhanced function block, there is an interworking with the control device, wherein the interworking is for the data packet.

The enhanced function means 30 executes an enhanced function on the data packet to obtain a first processed data packet addressed to a respective destination address (S30). The enhanced function is based on the received instruction for the data packet. The destination address may be the address of the main routing means 10 or different therefrom. Non-limiting examples of enhanced functions are tunneling, traffic shaping and policy enforcement.

The first routing means 40 routes the first processed data packet to the destination address determined by the enhanced function means 30 (S40).

If there are several enhanced function means they may share the providing means 20 and/or the first routing means 40.

On the other hand, if the data packet is routed to the stateless function block, the stateless function means 50 executes a respective stateless function on the data packet in order to thus, obtain a respective second processed data packet (S50). The stateless function is not based on an instruction for the data packet received in response to providing information comprised in the data packet to a control device. That is, in other words, there is no interworking of the stateless function and a control device for the data packet. Non-limiting examples of stateless functions are DPI, (de-)ciphering, and charging.

The returning means 60 returns the respective second processed data packet to the main routing means 10 (S60).

If there are several stateless function means they may share the returning means 60.

Preferably, if an enhanced function, which is based on an instruction from a control device for the data packet, is executed on a data packet received from the main routing means, it is routed to the destination address. On the other hand, if a stateless function, which is not based on an instruction from a control device for the data packet, is executed on a data packet received from the main routing means, it is returned to the main routing means 10.

"For the data packet" may mean "dedicated to the data packet" or "dedicated to a data packet stream to which the data packet belongs".

Figure 15:
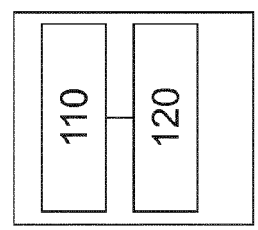
FIG. 15 shows an apparatus according to an embodiment of the invention.

FIG. 15 shows an apparatus according to an embodiment of the invention.

The apparatus comprises at least one processor 110 and at least one memory 120 including computer program code. The at least one processor 110, with the at least one memory 120 and the computer program code, is arranged to cause the apparatus to at least perform the method of FIG. 14.

Embodiments of the invention may be employed in a 3GPP network of any generation (3G, 4G, 5G, . . . ) or in a fixed network. In general, any network element may be based on the architecture described above. In particular, network elements forming an edge of a domain such as a GGSN and a BRAS may be an embodiment of the invention.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that the entities are based on different software. That is, each of the entities described in the present description may be based on a different software, or some or all of the entities may be based on the same software.

According to the above description, it should thus be apparent that exemplary embodiments of the present invention provide, for example a virtualized network element, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
  a processor; and
  a memory with the processor, wherein the memory including computer grogram code that, when executed by the processor, cause the apparatus to:
    route, based on a header of a data packet and an incoming port on which the data packet was received, the data packet to one of at least one enhanced function blocks and at least one stateless function blocks, wherein the data packet comprises the header and a payload; wherein
    when the data packet is routed to one of the at least one enhanced function blocks, provide a respective information comprised in the data packet to a respective control device;
    execute a respective enhanced function on the data packet to obtain a respective first processed data packet addressed to a respective destination address, wherein the respective enhanced function is based on a respective instruction for the data packet received in response to the provided information; and
    route the respective first processed data packet to the respective destination address; and
    when the data packet is routed to one of the at least one stateless function blocks, execute a respective stateless function on the data packet, wherein the respective stateless function is not based on a respective instruction for the data packet received in response to providing respective information comprised in the data packet to a respective control device, in order to, thus, obtain a respective second processed data packet; and
    return the respective second processed data packet to a main routing means function,
  wherein at least one of,
    when the apparatus executes a further enhanced function on the data packet received from the main routing means function to obtain a further first processed data packet addressed to a further destination address, wherein the further enhanced function is based on a further instruction for the data packet received in response to providing a further information comprised in the data packet to a further control device, then route the further first processed data packet to the destination address; and,
    when the apparatus executes a further stateless function on the data packet received from the main routing means function to obtain a further second processed data packet, wherein the stateless function is not based on a further instruction for the data packet received in response to providing respective information comprised in the data packet to a respective control device, then return the further second processed data packet to the main routing means function,
  wherein the routing of the data packet is based on the header, the incoming port, and a stored flow table, wherein the flow table defines a correlation between the incoming port and an outgoing port to which the respective one of the at least one enhanced function blocks and the at least one stateless function blocks is connected, and
  wherein analyze the respective header of at least one of the first processed data packet and the second processed data packet and to route the at least one of the first processed data packet and the second processed data packet based on the analysis of the respective header.

2. The apparatus according to claim 1, wherein the enhanced function comprises at least one of an enhanced modification of the payload, an enhanced usage of information comprised in the payload, and a generation of the destination address.

3. The apparatus according to claim 1, wherein the stateless function comprises at least one of a stateless modification of the payload and a stateless usage of information comprised in the payload.

4. The apparatus according to claim 1, wherein at least one of
  the at least one enhanced function comprises at least one of tunneling handling and policy enforcement, and
  the at least one stateless function comprises at least one of deep packet inspection, ciphering, and charging.

5. The apparatus according to claim 1, further comprising the respective at least one control device, wherein the at least one control device provides at least one of a broadband remote access server function, a security gateway function, and a gateway general packet radio service support node function.

6. The apparatus according to claim 1, wherein the control device provides a broadband remote access server function and a security gateway function,
  the apparatus execute the enhanced function and the stateless function related to the broadband remote access server function and the security gateway function, and
  analyze when a first processed data packet or a second processed data packet received from a respective enhanced function block and a stateless function block related to the security gateway function is related to plain internet traffic, and to route the received first processed data packet or second processed data packet to a first destination address comprised in the data packet.

7. A method, comprising:
  routing, based on a header of a data packet and an incoming port on which the data packet was received, the data packet to one of at least one enhanced function block and at least one stateless function block, wherein the data packet comprises the header and a payload; wherein
  when the data packet is routed to one of the at least one enhanced function blocks, the method performs providing a respective information comprised in the data packet to a respective control device;
  executing a respective enhanced function on the data packet to obtain a respective first processed data packet addressed to a respective destination address, wherein the respective enhanced function is based on a respective instruction for the data packet received in response to the provided information; and
  routing the respective first processed data packet to the respective destination address; and,
  when the data packet is routed to one of the at least one stateless function blocks, the method performs executing a respective stateless function on the data packet, wherein the respective stateless function is not based on a respective instruction for the data packet received in response to providing respective information comprised in the data packet to a respective control device, in order to, thus, obtain a respective second processed data packet; and returning the respective second processed data packet to a main routing means function, wherein at least one of, when the method executes a further enhanced function on the data packet received from the main routing means function to obtain a further first processed data packet addressed to a further destination address, wherein the further enhanced function is based on a further instruction for the data packet received in response to providing a further information comprised in the data packet to a further control device, then the method performs routing the further first processed data packet to the destination address; and, when the method executes a further stateless function on the data packet received from the main routing means function to obtain a further second processed data packet, wherein the stateless function is not based on a further instruction for the data packet received in response to providing respective information comprised in the data packet to a respective control device, then the method performs returning the further second processed data packet to the main routing means function, wherein the routing of the data packet is based on the header, the incoming port, and a stored flow table, wherein the flow table defines a correlation between the incoming port and an outgoing port to which the respective one of the at least one enhanced function blocks and the at least one stateless function blocks is connected, further comprising analyzing the respective header of at least one of the first processed data packet and the second processed data packet and routing the at least one of the first processed data packet and the second processed data packet based on the analysis of the respective header.

8. The method according to claim 7, wherein the enhanced function comprises at least one of an enhanced modification of the payload, an enhanced usage of information comprised in the payload, and a generation of the destination address.

9. The method according to claim 7, wherein the stateless function comprises at least one of a stateless modification of the payload and a stateless usage of information comprised in the payload.

10. The method according to claim 7, wherein at least one of the at least one enhanced function comprises at least one of tunneling handling and policy enforcement, and the at least one stateless function comprises at least one of deep packet inspection, ciphering, and charging.

11. The method according to claim 7, further comprising providing at least one of a broadband remote access server function, a security gateway function, and a gateway general packet radio service support node function.

12. The method according to claim 7, comprising providing a broadband remote access server function and a security gateway function, executing at least one of an enhanced function and a stateless function related to the broadband remote access server function and the security gateway function, and analyzing when a first processed data packet or a second processed data packet received from a respective enhanced function and a stateless function related to the security gateway function is related to plain internet traffic, and routing the received first processed data packet or second processed data packet to a first destination address comprised in the data packet.

13. A computer program product embodied on a non-transitory computer-readable medium, said product comprising a set of instructions which, when executed on an apparatus, is configured to cause the apparatus to carry out a method comprising:

routing, based on a header of a data packet and an incoming port on which the data packet was received, the data packet to one of at least one enhanced function block and at least one stateless function block, wherein the data packet comprises the header and a payload; wherein when the data packet is routed to one of the at least one enhanced function blocks, the method performs providing a respective information comprised in the data packet to a respective control device;

executing a respective enhanced function on the data packet to obtain a respective first processed data packet addressed to a respective destination address, wherein the respective enhanced function is based on a respective instruction for the data packet received in response to the provided information; and routing the respective first processed data packet to the respective destination address; and, when the data packet is routed to one of the at least one stateless function blocks, the method performs executing a respective stateless function on the data packet, wherein the respective stateless function is not based on a respective instruction for the data packet received in response to providing respective information comprised in the data packet to a respective control device, in order to, thus, obtain a respective second processed data packet; and returning the respective second processed data packet to a main routing means function, wherein at least one of, when the method executes a further enhanced function on the data packet received from the main routing means function to obtain a further first processed data packet addressed to a further destination address, wherein the further enhanced function is based on a further instruction for the data packet received in response to providing a further information comprised in the data packet to a further control device, then the method performs routing the further first processed data packet to the destination address; and, when the method executes a further stateless function on the data packet received from the main routing means function to obtain a further second processed data packet, wherein the stateless function is not based on a further instruction for the data packet received in response to providing respective information comprised in the data packet to a respective control device, then the method performs returning the further second processed data packet to the main routing means function, wherein the routing of the data packet is based on the header, the incoming port, and a stored flow table, wherein the flow table defines a correlation between the incoming port and an outgoing port to which the respective one of the at least one enhanced function blocks and the at least one stateless function blocks is connected, further comprising analyzing the respective header of at least one of the first processed data packet and the second processed data packet and routing the at least one of the first processed data packet and the second processed data packet based on the analysis of the respective header.

* * * * *